3,320,168
CATIONICALLY PREPARED COPOLYMERS OF 4-METHYL-1-PENTENE AND α,ω-DIENE AND LUBRICATING OILS CONTAINING SUCH POLYMERS

Shigeto Suzuki, San Francisco, Calif., assignor to Chevron Research Company, San Francisco, Calif., a corporation of Delaware
No Drawing. Filed Nov. 1, 1965, Ser. No. 505,958
5 Claims. (Cl. 252—59)

This invention is directed to novel copolymers of 4-methyl-1-pentene and α,ω-dienes prepared under cationic polymerization conditions and their use as viscosity index improvers in lubricating oils.

Lubricant compositions in many present-day applications contain viscosity index improvers in order to be effective over a wide temperature range. Viscosity index is an empirical scale developed by the petroleum industry to give a simple numerical expression to the relation of an oil viscosity to its temperature. With the broad temperature ranges required by modern-day engines, it is necessary that the lubricant be sufficiently fluid at low temperatures in order that it circulate freely and provide a lubricating film between wearing surfaces such as bearings, piston rings and cylinder walls. Alternatively, at high temperatures such as the operating temperatures of internal combustion engines the lubricant composition must be thick enough to provide a protective lubricating film.

It is well known that homopolymers of 4-methyl-1-pentene prepared with cationic catalysts at temperatures between about −35° and −70° C. may be used as additives for improving the viscosity index of multi-grade lubricating oils. Further, it is recognized that, in general, the viscosity improvement propertes of the homopolymers increase as the polymerization temperature is decreased over this range, other conditions remaining constant. Unfortunately, resort to lower polymerization temperatures to obtain better VI improving homopolymers carries with it some serious disadvantages. Firstly, lower temperatures require greater refrigeration expenditure. Also, use of lower temperatures may preclude the use of preferred polymerization media such as boiling propane which permit effective, simple and constant temperature control.

It has now been found that the viscosity index improvement properties of poly-4-methyl-1-pentene prepared by cationically polymerizing 4-methyl-1-pentene at temperatures between about −35° and −70° C. in the presence of from 0.05 to 5 weight percent based on 4-methyl-1-pentene monomer of cationic polymerization catalyst and an inert liquid hydrocarbon solvent may be enhanced by copolymerizing the 4-methyl-1-pentene under the above conditions with from about .02 to .08 mol percent α,ω-diene having 5 to 12 carbon atoms.

The cationic polymerization method used to prepare the copolymers of this invention is well established in the art. Usually the monomers which are to be polymerized are placed in a vessel along with an inert liquid hydrocarbon solvent and cooled to the desired temperature. From about 0.05 to 5 weight percent cationic polymerization catalyst is then added to the monomer mixture. The cationic polymerization catalysts useful in this invention are those known as Friedel-Crafts type catalysts. These catalysts comprise a principal catalyst which is usually the halide of a metal of Group II–IV such as aluminum chloride, aluminum bromide, titanium tetrachloride, boron trifluoride, boron tribromide, stannic chloride, etc., or the halide of a higher group metal such as ferric chloride and a cocatalyst such as an alkyl halide, hydrochloric acid, water or another substance which gives rise to protons or carbonium ions.

As previously indicated, the copolymerization of this invention takes place in the presence of an inert hydrocarbon solvent. Halogenated hydrocarbon solvents or liquid sulfur dioxide may also be used. Inert alkanes such as propane, butane, pentane, isopentane, heptane, ethane, etc. will normally be employed. Boiling propane is the preferred inert hydrocarbon medium. When refluxing propane is used as the medium, the polymerization temperature will approximate −42° C.

The α,ω-diene hydrocarbon with which 4-methyl-1-pentene is copolymerized is a straight chain α,ω-diene having the general formula:

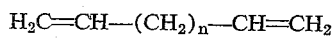

$$H_2C{=}CH{-}(CH_2)_n{-}CH{=}CH_2$$

wherein $n$ is an integer from 1 to 8. Accordingly, these dienes contain 5 to 12 carbon atoms and include 1,4-pentadiene, 1,5-hexadiene, 1,6-heptadiene, 1,7-octadiene, 1,8-nonediene, 1,9-decadiene 1,10-undecadiene and 1,11-dodecadiene.

The maximum amount of diene copolymerized with the 4-methyl-1-pentene is an important factor in this invention. It has been found that the shear stabilities of lubricating compositions fall off drastically when copolymers containing more than about 0.08 mol percent α,ω-diene are used as viscosity index improvers. Further, copolymers prepared under the conditions of this invention which contained in excess of 0.16 mol percent α,ω-diene were found to be substantially insoluble in lubricating oil.

The minimum amount of diene incorporated into the polymer should be enough to give noticeable improvement over the homopolymer when used to improve the viscosity index of lubricating oils. Usually, a copolymer having about 0.02 mol percent α,ω-diene will give a noticeable effect over a comparable homopolymer.

The polymers of this invention are ordinarily used in lubricating oils at concentrations from about 1 to about 20% by weight. However, lubricating oil concentrates containing as high as 60 or 70% by weight of the polymers in base lubricating oil may also be provided in accordance with this invention.

As viscosity index improvers the copolymers of this invention may be used with various base oils which find use as lubricating oils such as naphthenic base, paraffin base and mixed base petroleum lubricating oils, other hydrocarbon lubricants, e.g., alkylene polymers (such as polymers with propylene, butylene, etc., and mixtures thereof) and dicarboxylic esters.

The above base oils may be used individually or in combination whenever miscible or made so by the use of mutual solvents.

The following examples are offered in illustration of the copolymers of this invention and their use as viscosity index improvers in lubricating oils. These examples are offered by way of illustration and are in nowise limiting of the invention as described herein.

Example 1

Into a flask fitted with a stirrer, Dry Ice condenser, thermometer and cooled to about −40° C. was charged a solution consisting of 25.0 ml. 4-methyl-1-pentene, 75.0 ml. propane and 0.0125 ml. 1,7-octadiene (0.038 mol percent based on pentene monomer). After this solution had reached reflux, a mixture consisting of 0.2 gms. aluminum chloride and 3.0 ml. ethyl chloride was added to it dropwise over about an 11 minute period. During the addition, the temperature of the reaction mixture varied between −35.0° and −40.5° C. After the reaction was completed, 5 ml. ethyl alcohol and 150 ml. pentane were added and the temperature was raised slowly to room temperature. The reaction mixture was then washed twice with 200 ml. water and the copolymer product was precipitated with methanol and dried in an oven to give 15.72 gms. 4-methyl-1-pentene/1,7-octadiene copolymer. This copolymer had an intrinsic viscosity of 0.89 and its molecular weight was estimated to be 92,000.

*Example 2*

In the manner described in Example 1, a copolymer of 4-methyl-1-pentene and 1,7-octadiene containing twice as much of the latter monomer (0.076 mol percent based on the pentene monomer) was prepared. The intrinsic viscosity of this copolymer was determined to be 0.97 and its molecular weight was estimated to be 96,000.

Examples 1 and 2 were each made up as a 2.8 weight percent solution in 130 neutral oil. For comparative purposes, a homopolymer of 4-methyl-1-pentene prepared with the same catalyst concentration as used in Examples 1 and 2 at −40° C. was also made up as a 2.8 weight percent solution in 130 neutral oil. The viscosity of each of these solutions was determined at 210° F. and 100° F. and their viscosity indexes were determined in accordance with ASTM D567–53. Table I reports the results of this testing.

TABLE I

| Polymer In Oil | Mol. percent diene based on pentene monomer | Visc., 100° F. (S.S.U.) | Visc., 210° F. (S.S.U.) | V.I. |
|---|---|---|---|---|
| 4-methyl-1-pentene | 0 | 340.9 | 63.3 | 133 |
| Ex. 1 | 0.038 | 435.1 | 74.4 | 136 |
| Ex. 2 | 0.076 | 455.3 | 76.9 | 137 |

These results clearly show that the viscosity index improvement properties of cationically polymerized 4-methyl-1-pentene may be enhanced without resort to lower polymerization temperatures by copolymerization with small amounts of α,ω-diene. This result is indeed surprising and permits efficient expenditure of refrigeration and use of convenient polymerization media in preparing polymers of 4-methyl-1-pentene for use in lubricating oils.

As will be evident to those skilled in the art, various modifications of this invention can be made or followed, in the light of the foregoing disclosure and discussion, without departing from the spirit or scope of the disclosure or from the scope of the following claims.

I claim:
1. A copolymer composition prepared by copolymerizing 4-methyl-1-pentene and about .02 to .08 mol percent α,ω-diene having the formula:

$$H_2C=CH-(CH_2)_n-CH=CH_2$$

wherein *n* is an integer from 1 to 8 at from about −35° to −70° C. in the presence of 0.05 to 5 weight percent cationic polymerization catalyst, based on the pentene, and an inert hydrocarbon solvent.

2. The copolymer of claim 1 wherein said α,ω-diene is 1,7-octadiene.

3. The copolymer of claim 1 wherein said hydrocarbon solvent is propane.

4. A lubricating composition comprising a base lubricating oil and the copolymer of claim 1.

5. A lubricating composition comprising a base lubricating oil and the copolymer of claim 2.

References Cited by the Examiner

UNITED STATES PATENTS

| | | | |
|---|---|---|---|
| 2,356,367 | 8/1944 | Wright | 252—59 X |
| 2,825,721 | 3/1958 | Hogan et al. | |
| 2,913,448 | 11/1959 | Tabler | 260—88.2 X |
| 2,933,480 | 4/1960 | Gresham et al. | 260—80.7 X |
| 2,980,744 | 4/1961 | Voltz | 260—683.15 |
| 3,223,638 | 12/1965 | Anderson et al. | 252—59 |

DANIEL E. WYMAN, *Primary Examiner.*

W. H. CANNON, *Assistant Examiner.*